(12) United States Patent
Benjebbour et al.

(10) Patent No.: US 10,334,603 B2
(45) Date of Patent: Jun. 25, 2019

(54) RADIO BASE STATION, USER TERMINAL, RADIO COMMUNICATION SYSTEM, AND RADIO COMMUNICATION METHOD

(71) Applicant: NTT DOCOMO, INC., Tokyo (JP)

(72) Inventors: Anass Benjebbour, Tokyo (JP); Yoshihisa Kishiyama, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 14/766,851

(22) PCT Filed: Jan. 24, 2014

(86) PCT No.: PCT/JP2014/051447
§ 371 (c)(1),
(2) Date: Aug. 10, 2015

(87) PCT Pub. No.: WO2014/125892
PCT Pub. Date: Aug. 21, 2014

(65) Prior Publication Data
US 2016/0014785 A1 Jan. 14, 2016

(30) Foreign Application Priority Data
Feb. 12, 2013 (JP) .................................. 2013-024335

(51) Int. Cl.
*H04W 72/04* (2009.01)
*H04W 52/24* (2009.01)
(Continued)

(52) U.S. Cl.
CPC ....... *H04W 72/0473* (2013.01); *H04W 52/16* (2013.01); *H04W 52/241* (2013.01);
(Continued)

(58) Field of Classification Search
None
See application file for complete search history.

(56) References Cited

U.S. PATENT DOCUMENTS

2002/0172166 A1 11/2002 Arslan et al.
2006/0171347 A1* 8/2006 Attar ................. H04W 72/1263
370/328
(Continued)

FOREIGN PATENT DOCUMENTS

JP 2013-009291 A 1/2013
WO 2014069960 A1 5/2014

OTHER PUBLICATIONS

Higuchi et al. "Performance of Non-Orthogonal Access with SIC in Cellular Downlink Using Proportional Fair-Base Resource Allocation", Aug. 2012, retrieved from "www.ieeexplore.ieee.org/stamp.jsp?arnumber=6328413".*
(Continued)

*Primary Examiner* — Jamaal R Henson
(74) *Attorney, Agent, or Firm* — Osha Liang LLP

(57) ABSTRACT

The present invention is designed to provide a radio base station, a user terminal, a radio communication system and a radio communication method of novel structures that can improve the efficiency of the use of radio resources sufficiently. A plurality of user terminals feed back channel state information to a radio base station, the radio base station selects, from a plurality of candidate user sets and a plurality of power ratio sets, each of the candidate user sets indicating candidates of user terminals to be subject to non-orthogonal-multiplexing over a given radio resource and each of the power ratio sets indicating a transmission power ratio of downlink signals for the user terminals indicated in each of the candidate user sets, a candidate user set and a power ratio set to use in downlink signal transmission, based on the channel state information that is fed back, and transmits downlink signals for a plurality of user terminals indicated in the selected candidate user set using the transmission
(Continued)

power ratio indicated by the selected power ratio set, and the selected candidate user set receive the downlink signals.

8 Claims, 7 Drawing Sheets

(51) Int. Cl.
*H04W 52/16* (2009.01)
*H04W 52/34* (2009.01)
*H04W 88/08* (2009.01)
*H04W 52/14* (2009.01)

(52) U.S. Cl.
CPC ........ *H04W 52/346* (2013.01); *H04W 52/143* (2013.01); *H04W 88/08* (2013.01)

(56) References Cited

U.S. PATENT DOCUMENTS

| | | | |
|---|---|---|---|
| 2006/0240858 A1* | 10/2006 | Yamazaki | H04W 52/322 455/522 |
| 2007/0060167 A1* | 3/2007 | Damnjanovic | H04W 52/24 455/450 |
| 2007/0293203 A1* | 12/2007 | Usuda | H04W 28/22 455/414.3 |
| 2009/0252247 A1* | 10/2009 | Lee | H04B 7/0417 375/267 |
| 2009/0327835 A1* | 12/2009 | Oteri | H04J 11/0043 714/758 |
| 2012/0103834 A1* | 5/2012 | Wilsey | C12Q 1/001 205/777.5 |
| 2012/0177018 A1 | 7/2012 | Abraham et al. | |
| 2012/0201162 A1* | 8/2012 | Kim | H04B 17/345 370/252 |
| 2014/0050279 A1 | 2/2014 | Kishiyama | |
| 2014/0126404 A1 | 5/2014 | Kim et al. | |

OTHER PUBLICATIONS

Extended European Search Report dated Sep. 1, 2016, in corresponding European Patent Application No. 147518-1.3 (9 pages).
International Search Report issued in corresponding application No. PCT/JP2014/051447 dated Mar. 18, 2014 (1 page).
3GPP TR 25.913 V9.0.0, "3rd Generation Partnership Project; Technical Specification Group Radio Access Network; Requirements for Evolved UTRA (E-UTRA) and Evolved UTRAN (E-UTRAN) (Release 9)"; Dec. 2009 (18 pages).
Extended European Search Report issued in the counterpart European Patent Application No. 18168174.3, dated Jul. 11, 2018 (8 pages).

\* cited by examiner

RADIO BASE STATION, USER TERMINAL, RADIO COMMUNICATION SYSTEM, AND RADIO COMMUNICATION METHOD

TECHNICAL FIELD

The present invention relates to a radio base station, a user terminal, a radio communication system and a radio communication method.

BACKGROUND ART

The specifications of long-term evolution (LTE) have been developed for the purpose of achieving increased speed, lower delay and so on in UMTS (Universal Mobile Telecommunications System) (non-patent literature 1). In LTE, a communication scheme that is based on OFDMA (Orthogonal Frequency Division Multiple Access) is used in downlink channels (downlink), and a communication scheme that is based on SC-FDMA (Single Carrier Frequency Division Multiple Access) is used in uplink channels (uplink).

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

Now, future radio communication systems, which are referred to as, for example, "FRA (Future Radio Access)," are anticipated to employ communication schemes that make applied use of non-orthogonal multiple access (NOMA (Non-Orthogonal Multiple Access)), which is premised on canceling interference on the receiving side. In NOMA, information data sequences for a plurality of user terminals of varying channel gains are multiplexed over the same radio resources (frequency band, time slots, etc.). Each information data sequence is transmitted with different transmission power depending on the channel gain, so that each user terminal can cancel signals for other terminals by means of SIC (Successive Interference Cancellation) and so on, and adequately acquire the information for the subject terminal.

As described above, in NOMA, a plurality of information data sequences are multiplexed over the same radio resources. Consequently, it may be possible to improve the efficiency of the use of radio resources even more by combining NOMA with OFDMA. However, conventional NOMA is optimized for communication environments with relatively low processing capabilities, and therefore is not necessarily effective in future radio communication systems that presume high processing capabilities.

The present invention has been made in view of the above, and it is therefore an object of the present invention to provide a radio base station, a user terminal, a radio communication system and a radio communication method of novel structures that can improve the efficiency of the use of radio resources sufficiently.

Solution to Problem

The radio base station of the present invention has a receiving section that receives channel state information fed back from a plurality of user terminals, a scheduling section that selects, from a plurality of candidate user sets and a plurality of power ratio sets, each of the candidate user sets indicating candidates of user terminals to be subject to non-orthogonal-multiplexing over a given radio resource and each of the power ratio sets indicating a transmission power ratio of downlink signals for user terminals indicated in each of candidate user sets, a candidate user set and a power ratio set to use in downlink signal transmission, based on the channel state information that is fed back, and a transmission section that transmits downlink signals for a plurality of user terminals indicated in the selected candidate user set using a transmission power ratio indicated by the selected power ratio set.

Advantageous Effects of Invention

According to the present invention, it is possible to provide a radio base station, a user terminal, a radio communication system and a radio communication method of new structures that can improve the efficiency of the use of radio resources sufficiently.

DESCRIPTION OF EMBODIMENTS

Figure 1:
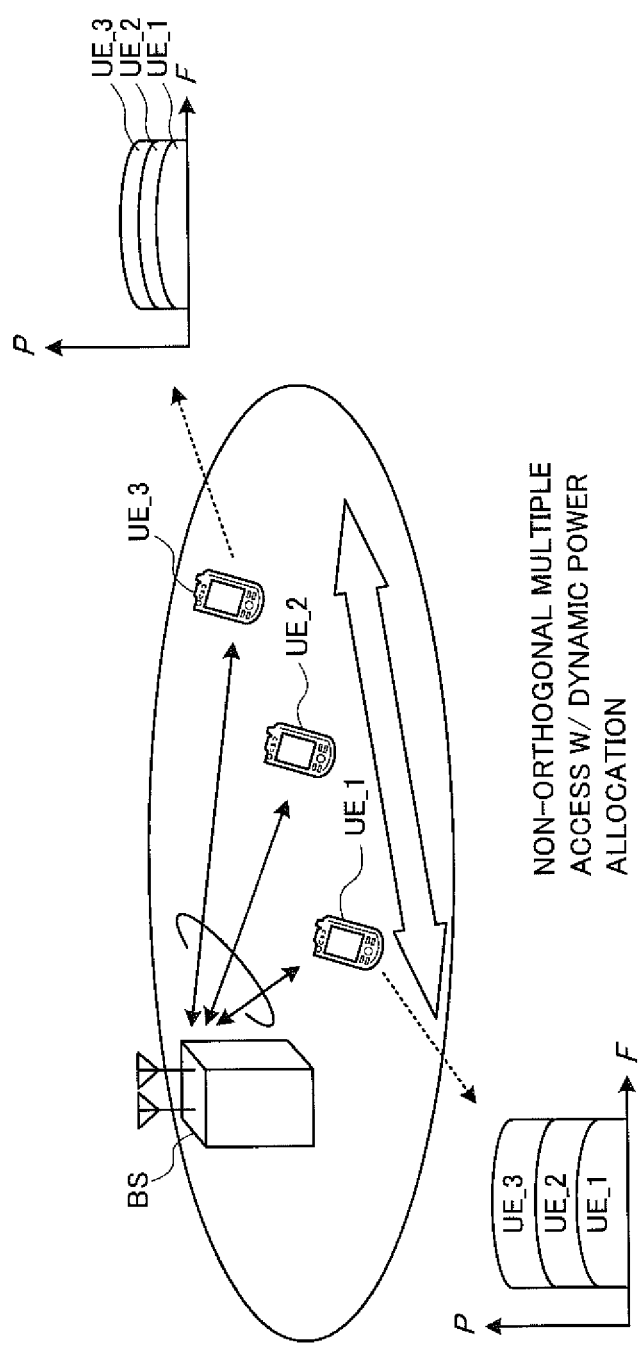
FIG. 1 is a schematic diagram to illustrate an example basic structure of a radio communication system where NOMA is employed.

FIG. 1 is a schematic diagram to illustrate an example basic structure of a radio communication system where NOMA (Non-Orthogonal Multiple Access) is employed. FIG. 1 illustrates an example of a cell formed by a radio base station BS. In the coverage area of the radio base station BS, a plurality of user terminals UE (here, user terminals UE_1, UE_2 and UE_3) are present. In this radio communication system, downlink signals for a plurality of user terminals UE can be non-orthogonal-multiplexed over the same radio resources (frequency band, time slots, etc.) and transmitted with different transmission power.

In the radio communication system illustrated in FIG. 1, transmission power is controlled in accordance with, for example, the channel gain (most typically, the received SINR) of each user terminal UE, the path loss between the radio base station BS and each user terminal UE (propagation loss and route loss), and so on. For example, control is executed so that low transmission power is allocated to user terminal UE_1 where the channel gain is high (the received SINR is high and the path loss is low), and high transmission power is allocated to user terminal UE_3 where the channel gain is low (the received SINR is low and the path loss is to high).

By means of this transmission power control, for example, the signals for user terminals UE_1 and UE_2 become sufficiently weak in the location where user terminal UE_3 serves. Consequently, user terminal UE_3 can disregard the interference by the signals for user terminals UE_1 and UE_2, and receive the signal for the subject terminal. On the other hand, the signals for user terminals UE_2 and UE_3 are strong in the location where user terminal UE_1 serves. Consequently, user terminal UE_1 receives the signals for user terminals UE_2 and UE_3 in addition to the signal for the subject terminal.

In NOMA, signals for user terminals UE are multiplexed in an identifiable manner, so that, for example, user terminal UE_1 can decode and cancel the signals for user terminals UE_2 and UE_3. By means of such SIC (Successive Interference Cancellation) reception, each user terminal UE can adequately separate and acquire the signal for the subject terminal that is non-orthogonal-multiplexed.

Figure 2:
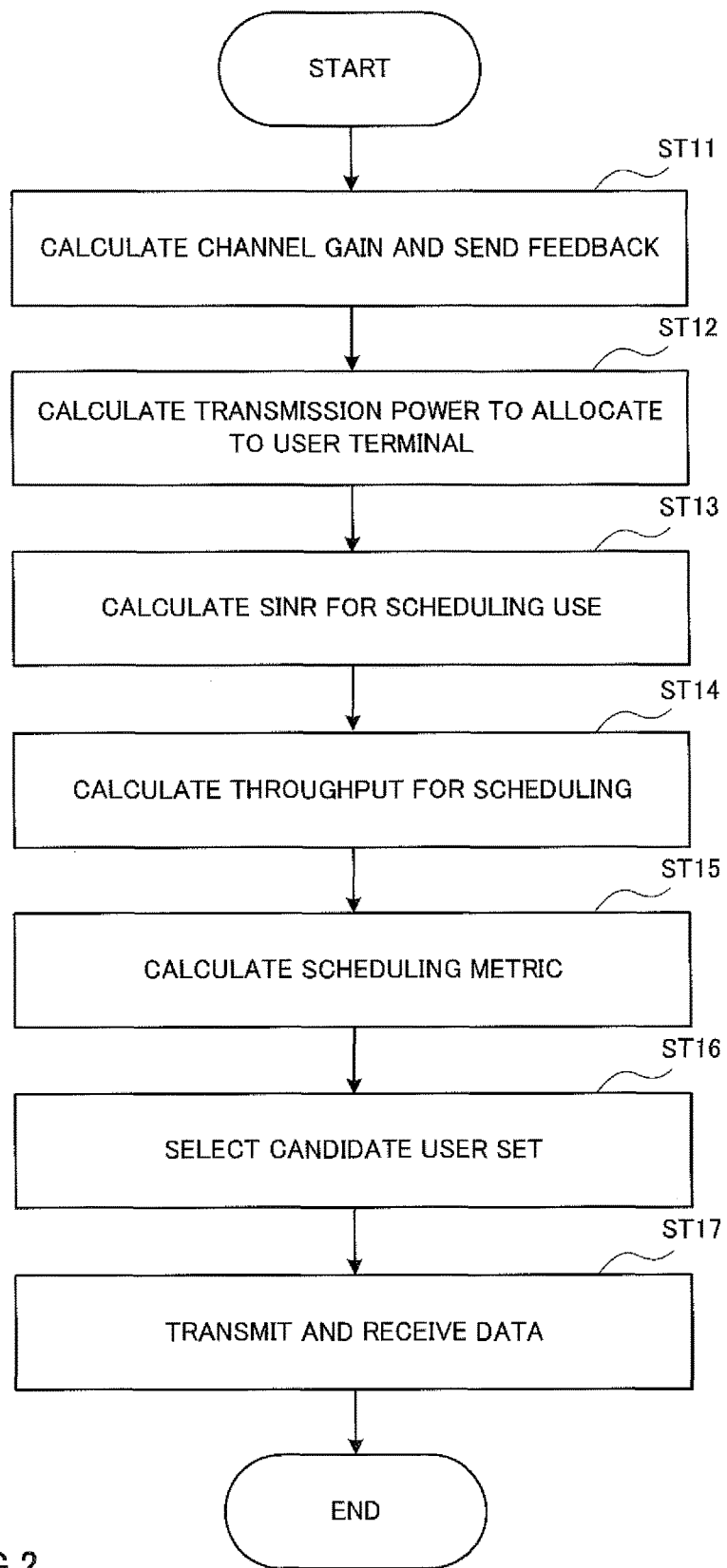
FIG. 2 is a flowchart to explain a NOMA communication sequence.

Now, the communication sequence in NOMA will be described. FIG. 2 is a flowchart to explain a NOMA communication sequence. First, a radio base station BS transmits a downlink reference signal to each user terminal UE. As for this reference signal, for example, the CSI-RS (Channel State Information Reference Signal), the DM-RS (DeModulation Reference Signal) and so on may be used. Each user terminal UE calculates the channel gain (for example, the received SINR) based on the reference signal received, and feeds back channel state information (CSI) to the radio base station BS (step ST11).

The radio base station BS carries out a series of processes (step ST12 to ST16), which will be described later, based on the CSI that is fed back from each user terminal UE, so as to determine the combination of user terminals UE to be subject to non-orthogonal multiplexing. To be more specific, from a plurality of candidate user sets, which each represent candidate user terminals UE to be subject to multiplexing over a given frequency band (subband), the radio base station BS selects one candidate user set.

The total number of candidate user sets, which are provided per subband corresponding to each transmission beam, can be represented by following equation 1, where the maximum number of user terminals UE that can be subject to the non-orthogonal-multiplexing is $N_{max}$, and the total number of user terminals UE that are present in the coverage area of a transmission beam is M. The radio base station BS selects one candidate user set out of all the candidate user sets that are represented by equation 1 (exhaustive search).

(Equation 1)

$$\binom{M}{1}+\binom{M}{2}+\ldots+\binom{M}{N_{max}} \quad [1]$$

The series of processes (step ST12 to ST16) for determining the combination of user terminals UE will be described in detail. First, the radio base station BS calculates the transmission power to allocate to the user terminals UE of each candidate user set based on the CSI that is provided as feedback (step ST12). Transmission power $P_{k,b}$ that is allocated to the k-th user terminal UE in the b-th subband is calculated by following equation 2 based on fractional transmission power control (FTPC: Fractional Tx Power Control). In equation 2, K is the number of user terminals UE in each candidate user set, $P_b$ is the transmission power of the b-th subband, $h_{k,b}$ is the square value of the channel coefficient of the target user terminal UE (the k-th user terminal UE in the b-th subband), and $N_{k,b}$ is the noise observed in the target user terminal UE. That is, $h_{k,b}/N_{k,b}$ is equivalent to the channel gain of the target user terminal UE. Also, α in equation 2 is a parameter for adjusting the allocation of transmission power to each user terminal UE, and is a fixed value.

(Equation 2)

$$P_{k,b} = \frac{P_b}{\sum_{i=1}^{K}\left(\frac{h_{i,b}}{N_{i,b}}\right)^{-\alpha}}\left(\frac{h_{k,b}}{N_{k,b}}\right)^{-\alpha} \quad [2]$$

Next, the radio base station BS calculates the $SINR_{k,b}$ (the SINR for scheduling) of each user terminal UE anticipated under the application of NOMA, based on following equation 3, which includes the transmission power $P_{k,b}$ calculated (step ST13).

(Equation 3)

$$SINR_{k,b} = \frac{h_{k,b}P_{k,b}}{\sum_{i=1,\frac{h_{k,b}}{N_{k,b}}<\frac{h_{i,b}}{N_{i,b}}}^{K} h_{k,b}P_{i,b} + N_{k,b}} \quad [3]$$

After that, the radio base station BS compares the $SINR_{k,b}$ calculated for each user terminal UE against a table that indicates the block error rate (BLER) of each MCS (Modulation and Coding Scheme) set, and determines the BLER. Then, based on following equation 4, the radio base station BS calculates the dynamic throughput $R_{k,b}$ of each user terminal UE for scheduling (step ST14).

$$R_{k,b}=(1-\text{BLER})\times\text{SpectrumEfficiency[MCS]} \quad \text{(Equation 4)}$$

The radio base station BS applies the dynamic throughput $R_{k,b}$ of each user terminal UE and the average throughput $T_k$ of each user terminal UE, which will be described later, to following equations 5 and 6, and calculates scheduling metrics $M_{sj}$ for the candidate user sets $S_j$ (step ST15). Two kinds of scheduling metrics $M_{sj}$ are calculated here by using equations 5 and 6, so as to allow easy comparison of the characteristics of each candidate user set $S_j$. In equations 5 and 6, $t_c$ is the window size, and W is the weighting coefficient.

(Equation 5)

$$M_{S_j} = \prod_{k \in S_j}\left(1 + \frac{R_{k,b}(t)}{(t_c - 1)T_k^W(t)}\right) \quad [5]$$

(Equation 6)

$$M_{S_j} = \sum_{k \in S_j} \frac{R_{k,b}(t)}{T_k^W(t)} \quad [6]$$

Next, as illustrated in following equation 7, the radio base station BS selects the candidate user set $S_j$ that gives the maximum scheduling metric $M_{s_j}$ in each subband (step ST16). Also, the radio base station BS non-orthogonal-multiplexes the downlink signals for each user terminal UE in each subband, and transmits them with the transmission power of equation 2 (step ST17). Furthermore, based on these scheduling results, as illustrated in following equation 8, the radio base station BS updates the average throughput $T_k$ of each user terminal UE.

(Equation 7)

$$S_j = \mathrm{argmax}_{S_j}(M_{S_j}) \qquad [7]$$

(Equation 8)

$$T_k(t+1) = \left(1 - \frac{1}{t_c}\right)T_k(t) + \frac{1}{t_c}\sum_{k=1}^{N_{sub}}\frac{R_{k,b}(t)}{N_{sub}} \qquad [8]$$

Each user terminal UE included in the candidate user set $S_j$ that is selected in the above process receives the signal for the subject terminal that is non-orthogonal-multiplexed over the same radio resources with other terminals' signals (step ST17). Then, each user terminal UE cancels the signals for user terminals UE where the channel gain is lower than at the subject terminal (the received SINR is lower and the path loss is higher) by means of SIC, and separates the signal for the subject terminal. The signals for user terminals UE where the channel gain is higher than at the subject terminal (the received SINR is higher and the path loss is lower) do not give significant interference, and are therefore disregarded.

Now, in NOMA, the transmission power of downlink signals for each user terminal UE is calculated based on equation 2. In equation 2, the allocation of transmission power to each user terminal UE is adjusted by a, which is a fixed value. That is, in NOMA, transmission power is determined so that power ratios that are determined in advance are assumed depending on the channel gain of each user terminal UE. In this way, the method of adjusting the transmission power of downlink signals for each user terminal UE by using fixed power ratios is suitable for communication systems with comparatively low processing capabilities.

However, the optimal power ratio for a user terminal UE varies depending on the differences between the SNRs of individual user terminals UE. The differences between the SNRs of user terminals UE depend on the location each user terminal UE is present (path loss, fading and so on), and therefore, in future radio communication systems anticipated to have high processing capabilities, the method of using fixed power ratios as described above is not necessarily effective to improve the efficiency of the use of radio resources.

Given this problem, the present inventors have thought that it may be possible to improve the efficiency of the use of radio resources in future radio communication systems sufficiently, by structuring a radio communication system so that the power ratio can be selected depending the communication environment each user terminal UE is in. Then, based on this idea, the present inventors have made the present invention. That is, a gist of the present invention is to prepare a plurality of power ratio sets, which each indicate a transmission power ratio of downlink signals for each user terminal UE, in advance, and adjust the transmission power ratio of downlink signals by selecting appropriate power ratio sets depending on the communication environment each user terminal UE is in. Now, the radio communication method according to the present embodiment will be described below in detail.

(Radio Communication Method)

Figure 3:
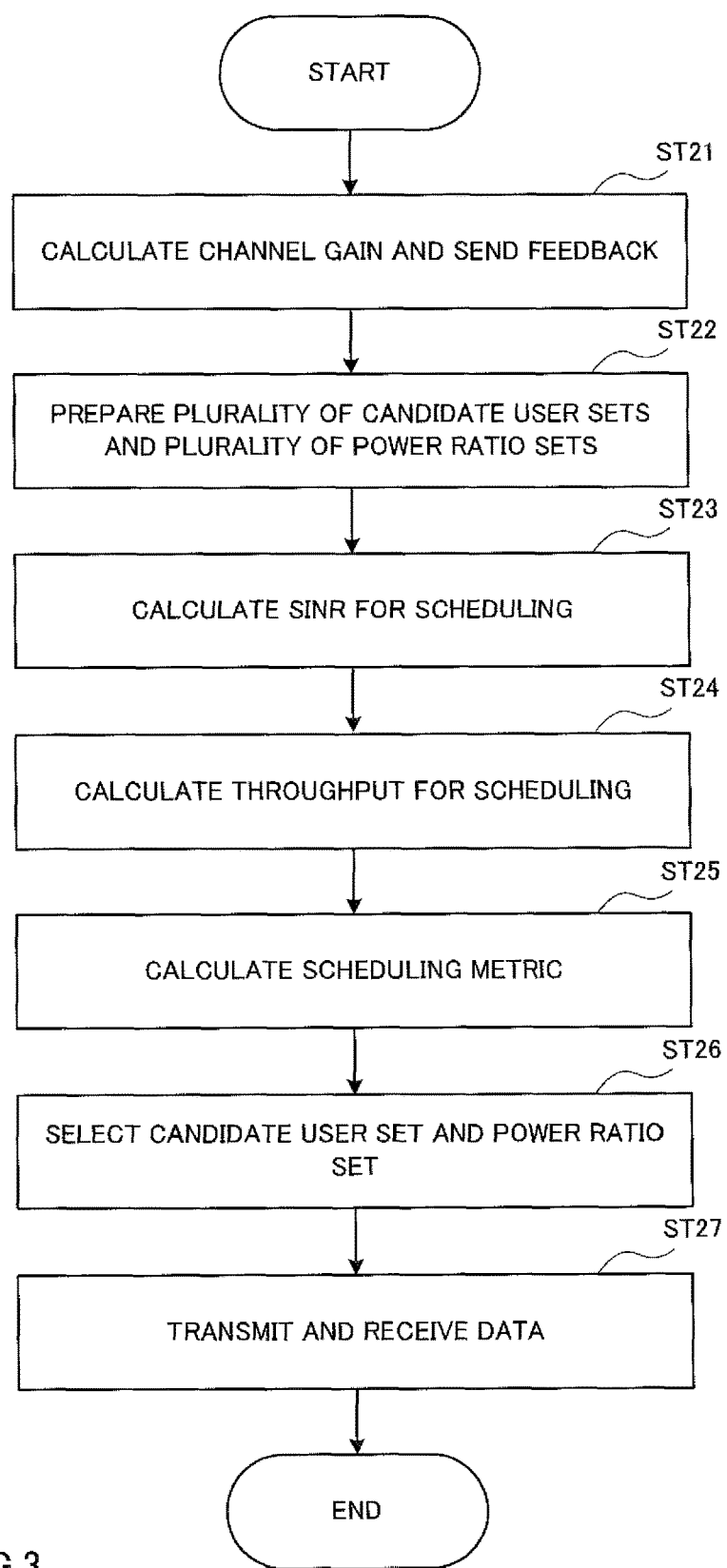
FIG. 3 is a flowchart to explain a communication sequence by a radio communication method according to the present embodiment.

FIG. 3 is a flowchart to explain a communication sequence in the radio communication method according to the present embodiment. First, a radio base station BS transmits a downlink reference signal (the CSI-RS, the DM-RSs and so on) to user terminals UE. Each user terminal UE calculates the channel gain (for example, the received SINR) based on the reference signal received, and feeds back this to the radio base station BS as channel state information (CSI) (step ST21).

The radio base station BS carries out a series of processes, which will be described later, based on the CSI that is fed back from each user terminal UE, so as to determine the combination of user terminals UE to be subject to non-orthogonal multiplexing (steps ST22 to ST26). To be more specific, the radio base station BS prepares a plurality of candidate user sets, which each indicate candidates of user terminals UE to be subject to the multiplexing in a given frequency band (subband), and a plurality of power ratio sets, which each indicate a transmission power ratio of downlink signals for the user terminals UE indicated in each candidate user set (step ST22), and selects a candidate user set and a power ratio set from the plurality of candidate user sets and the plurality of power ratio sets (steps ST23 to ST26).

The total number of combinations of candidate user sets and power ratio sets, provided per subband corresponding to each transmission beam, is given by following equation 9, where $N_{max}$ is the maximum number of user terminals UE that can be subject to the non-orthogonal-multiplexing, M is the total number of user terminals UE that are present in the coverage combinations of power ratio sets that may be assumed when the number of user terminals UE to be subject to the non-orthogonal-multiplexing ranges from 2 to $N_{max}$. From a plurality of combinations of candidate user sets and power ratio sets represented by equation 9, the radio base station BS selects a combination of a candidate user set and a power ratio set (exhaustive search).

(Equation 9)

$$\binom{M}{1} + N_2\binom{M}{2} + \ldots + N_{N_{max}}\binom{M}{N_{max}} \qquad [9]$$

For example, as illustrated in FIG. 1, assume the situation where user terminals UE_1, UE_2 and UE_3 are present in the coverage area of a transmission beam. Assume that the maximum number of user terminals UE that can be subject to the non-orthogonal-multiplexing is 3. When the number of user terminals UE to be subject to the non-orthogonal-multiplexing is 1—that is, when the user terminals UE are not non-orthogonal-multiplexed—the candidate user set comprised only of user terminal UE_1 (hereinafter "[UE_1]"), the candidate user set comprised only of user terminal UE_2 (hereinafter "[UE_2]"), and the candidate user set comprised only of user terminal UE_3 (hereinafter "[UE_3]") are possible.

When the number of user terminals UE to be subject to the non-orthogonal-multiplexing is 2, the candidate user set comprised of user terminals UE_1 and UE_2 (hereinafter "[UE_1, UE_2]"), the candidate user set comprised of user terminals UE_2 and UE_3 (hereinafter "[UE_2, UE_3]") and the candidate user set comprised of user terminals UE_3 and UE_1 (hereinafter "[UE_3, UE_1]") are possible. Also, when the number of user terminals UE that are subject to the non-orthogonal-multiplexing is 3, the candidate user set comprised of user terminals UE_1, UE_2 and UE_3 (hereinafter "[UE_1, UE_2, UE_3]") is possible. That is, there are a total of seven patterns of candidate user sets.

When the number of user terminals UE to be subject to the non-orthogonal-multiplexing is 1, it is not necessary to take into account the allocation of transmission power between a plurality of user terminals UE. That is, the three patterns of candidate user sets [UE_1], [UE_2] and [UE_3] each can assume only one pattern of a power ratio set.

When the number of user terminals UE to be subject to the non-orthogonal-multiplexing is 2, it is necessary to take into account the allocation of transmission power between the two user terminals UE. Hereinafter, a power ratio set to indicate the allocation of transmission power between two user terminals UE will be represented by "[P1, P2]." Here, P1+P2=P (the sum value transmission power) holds. For example, assume that a power ratio set to represent the transmission power ratio of 1:9 (hereinafter "[0.1P, 0.9P]"), a power ratio set to represent the transmission power ratio of 2:8 (hereinafter "[0.2P, 0.8P]"), and a power ratio set to represent the transmission power ratio of 3:7 (hereinafter "[0.3P, 0.7P]") are prepared.

Referring to the case of FIG. 1, if user terminals UE_1 and UE_2, constituting the candidate user set [UE_1, UE_2] are sorted from the lower channel gain (from the lower received SINR and the greater path loss), the order of user terminals UE_2 and UE_1 holds. Given that the user terminal UE of the lower channel gain (the lower received SINR and the higher path loss) is allocated higher transmission power, in the combination of the candidate user set [UE_1, UE_2] and the power ratio set [0.1P, 0.9P], the transmission power P1 to be allocated to user terminal UE_1 is 0.1P, and the transmission power P2 to be allocated to user terminal UE_2 is 0.9P. Also, in the combination of the candidate user set [UE_1, UE_2] and the power ratio set [0.2P, 0.8P], the transmission power P1 to be allocated to user terminal UE_1 is 0.2P, and the transmission power P2 to be allocated to user terminal UE_2 is 0.8P. Furthermore, in the combination of the candidate user set [UE_1, UE_2] and the power ratio set [0.3P, 0.7P], the transmission power P1 to be allocated to user terminal UE_1 is 0.3P, and the transmission power P2 to be allocated to user terminal UE_2 is 0.7P.

The same holds with the candidate user sets [UE_2, UE_3] and [UE_3, UE_1]. That is, in the combination of the candidate user set [UE_2, UE_3] and the power ratio set [0.1P, 0.9P], the transmission power P2 to be allocated to user terminal UE_2 is 0.1P, and the transmission power P3 to be allocated to user terminal UE_3 is 0.9P. Also, in the combination of the candidate user set [UE_2, UE_3] and the power ratio set [0.2P, 0.8P], the transmission power P2 to be allocated to user terminal UE_2 is 0.2P, and the transmission power P3 to be allocated to user terminal UE_3 is 0.81P. Furthermore, in the combination of the candidate user set [UE_2, UE_3] and the power ratio set [0.3P, 0.7P], the transmission power P2 to be allocated to user terminal UE_2 is 0.3P, and the transmission power P3 to be allocated to user terminal UE_3 is 0.7P.

Also, in the combination of the candidate user set [UE_3, UE_1] and the power ratio set [0.1P, 0.9P], the transmission power P1 to be allocated to user terminal UE_1 is 0.1P, and the transmission power P3 to be allocated to user terminal UE_1 is 0.9P. Also, in the combination of the candidate user set [UE_3, UE_1] and the power ratio set [0.2P, 0.8P], the transmission power P1 to be allocated to user terminal UE_1 is 0.2P, and the transmission power P3 to be allocated to user terminal UE_3 is 0.8P. Also, in the combination of the candidate user set [UE_3, UE_1] and the power ratio set [0.3P, 0.7P], the transmission power P1 to be allocated to user terminal UE_1 is 0.3P, and the transmission power P3 to be allocated to user terminal UE_3 is 0.7P.

When the number of user terminals UE to be subject to the non-orthogonal-multiplexing is 3, it is necessary to take into account the allocation of transmission power among the three user terminals UE. Hereinafter, a power ratio set to represent the allocation of transmission power among three user terminals UE will be represented by [P1, P2, P3]. Here, P1+P2+P3=P (the sum value of transmission power) holds. Assume, for example, that a power ratio set to represent the transmission power ratio of 1:2:7 (hereinafter "[0.1P, 0.2P, 0.7P]"), a power ratio set to represent the transmission power ratio of 1:3:6 (hereinafter "[0.1P, 0.3P, 0.6P]"), and a power ratio set to represent the transmission power ratio of 1:4:5 (hereinafter "[0.1P, 0.4P, 0.5P]") are prepared.

Referring to the case of FIG. 1, if user terminals UE_1, UE_2 and UE_3 constituting the candidate user set [UE_1, UE_2, UE_3] are sorted from the lowest channel gain (the lowest received SINR and the highest path loss), the order of user terminals UE_3, UE_2 and UE_1 holds. Consequently, in the combination of the candidate user set [UE_1, UE_2, UE_3] and the power ratio set [0.1P, 0.2P, 0.7P], the transmission power P1 to be allocated to user terminal UE_1 is 0.1P, the transmission power P2 to be allocated to user terminal UE_2 is 0.2P, and the transmission power P3 to be allocated to user terminal UE_3 is 0.7P. Also, in the combination of the candidate user set [UE_1, UE_2, UE_3] and the power ratio set [0.1P, 0.3P, 0.6P], the transmission power P1 to be allocated to user terminal UE_1 is 0.1P, the transmission power P2 to be allocated to user terminal UE 2 is 0.3P, and the transmission power P3 to be allocated to user terminal UE_3 is 0.6P. Furthermore, in the combination of the candidate user set [UE_1, UE_2, UE_3] and the power ratio set [0.1P, 0.4P, 0.5P], the transmission power P1 to be allocated to user terminal UE_1 is 0.1P, the transmission power P2 to be allocated to user terminal UE_2 is 0.4P, and the transmission power P3 to be allocated to user terminal UE_3 is 0.5P.

In this way, the transmission power of downlink signals for each user terminal UE is determined in accordance with the combination of the candidate user set and the power ratio set. That is, the transmission power $P_{k,b}$ that is allocated to the k-th user terminal UE in the b-th subband is represented as in following equation 10. In equation 10, $P_b$ is the transmission power for the b-th subband. $\alpha_k$ is a parameter for adjusting the allocation of transmission power to each user terminal UE, and corresponds to the power ratio set.

$$P_{k,b}=\alpha_k P_b \qquad \text{(Equation 10)}$$

Using the above transmission power $P_{k,b}$, which is determined depending on the combination of the candidate user set and the power ratio set, the radio base station BS calculates the $SINR_{k,b}$ (the SINR for scheduling) of each user terminal UE anticipated under the application of NOMA, based on equation 3 (step ST23).

(Equation 3)

$$SINR_{k,b} = \frac{h_{k,b}P_{k,b}}{\sum_{i=1, \frac{h_{k,b}}{N_{k,b}} < \frac{h_{i,b}}{N_{i,b}}}^{K} h_{k,b}P_{i,b} + N_{k,b}}$$ [11]

After that, the radio base station BS compares the $SINR_{k,b}$ calculated for each user terminal UE against a table that indicates the block error rate (BLER) of each MCS set, and determines the BLER. Then, based on equation 4, the radio base station BS calculates the dynamic throughput $R_{k,b}$ of each user terminal UE for scheduling (step ST24).

(Equation 4)

$$R_{k,b} = (1-BLER) \times SpectrumEfficiency[MCS]$$ [12]

The radio base station BS applies the dynamic throughput $R_{k,b}$ of each user terminal UE and the average throughput $T_k$ of each user terminal UE to equations 5 and 6, and calculates scheduling metrics M (step ST25).

(Equation 5)

$$M_{S_j} = \prod_{k \in S_j} \left(1 + \frac{R_{k,b}(t)}{(t_c - 1)T_k^W(t)}\right)$$ [13]

(Equation 6)

$$M_{S_j} = \sum_{k \in S_j} \frac{R_{k,b}(t)}{T_k^W(t)}$$ [14]

Next, as illustrated in equation 7, the radio base station BS selects the candidate user set and the power ratio set that give the maximum scheduling metric $M_{sj}$ in each subband (step ST26). Also, the radio base station BS transmits downlink signals to each user terminal UE with the transmission power of equation 10 (step ST27). Furthermore, based on these scheduling results, as the radio base station BS updates the average throughput $T_k$ of each user terminal UE given by equation 8.

(Equation 7)

$$S_j = \text{argmax}_{S_j}(M_{S_j})$$ [15]

(Equation 8)

$$T_k(t+1) = \left(1 - \frac{1}{t_c}\right)T_k(t) + \frac{1}{t_c}\sum_{k=1}^{N_{sub}} \frac{R_{k,b}(t)}{N_{sub}}$$ [16]

Each user terminal UE included in the candidate user set that is selected in the above process receives the signal for the subject terminal that is non-orthogonal-multiplexed over the same radio resources with other terminals' signals (step ST27). Then, each user terminal UE cancels the signals for user terminals UE where the channel gain is lower than at the subject terminal (the received SINR is lower and the path loss is higher) by means of SIC, and separates the signal for the subject terminal. The signals for user terminals UE where the channel gain is higher than at the subject terminal (the received SINR is higher and the path loss is lower) do not give significant interference, and are therefore disregarded.

In this radio communication method, each user terminal UE has to choose between canceling signals for other terminals by means of SIC, and seeing signals for other user terminals as noise and disregarding them without cancelation by SIC. Each user terminal UE can make this choice only if the user terminal is able to know the power ratio set used in non-orthogonal multiplexing, and the transmission power allocated to the subject terminal. So, the radio base station BS reports these pieces of information to each user terminal UE.

To be more specific, the radio base station BS reports information that corresponds to the selected power ratio set (common report information) to each user terminal UE indicated in the candidate user set that is selected. That is, the radio base station BS reports information that corresponds to the selected power ratio set to all the user terminals UE that are subject to the non-orthogonal-multiplexing in each subband. Also, the radio base station BS reports information related to downlink signal transmission power, which is specific to each user terminal UE (dedicated report information), to each user terminal UE indicated in the candidate user set that is selected. That is, to a given user terminal UE, the radio base station BS reports information that relates to the transmission power of downlink signals transmitted to that user terminal UE.

These reports may be sent by using, for example, higher layer signaling (such as RRC signaling), signaling by PDCCH control information, and so on. In particular, signaling by PDCCH control information makes it easy to send reports per subband or per user terminal UE, and therefore is suitable for these reports. Note that the above-noted common report information and dedicated report information may be subject to joint encoding. For example, if the alignment of the bit sequence of the power ratio set is rearranged so that the power ratio pertaining to the user terminal UE of the target of reporting comes at the top bit, each user terminal UE can acquire information related to the transmission of the signals for the subject terminal, and the selected power ratio set, all together. By means of such joint encoding, it is also possible to reduce the overhead pertaining to reporting. Note that the manner of joint encoding is by no means limited to this.

Also, for example, when maximum two user terminals UE are subject to multiplexing, it is possible to report only $P_{desired}$, which is the power allocate to the desired user terminal UE, via the PDCCH or by higher layer signaling (for example, RRC signaling), and report the total transmission power P by higher layer signaling (for example, RRC signaling). In this case, each user terminal UE will know P and $P_{desired}$, so that the power that is allocated to an interfering user terminal UE can be estimated by P-$P_{desired}$.

Each user terminal UE having received the reports of these pieces of information cancels, for example, signals for user terminals UE that are allocated greater transmission power than the subject terminal, by means of SIC, in descending order of transmission power, based on the pieces of information reported. Also, each user terminal UE disregards signals for user terminals UE that are allocated lower transmission power than the subject terminal as noise, without cancelation by means of SIC.

In this way, with the radio communication method according to the present embodiment, a plurality of power ratio sets that each represent a transmission power ratio of downlink signal for each user terminal UE are prepared, and the radio base station BS selects appropriate power ratio sets depending on the communication environment each user terminal UE is in, so that it is possible to improve the efficiency of the use of radio resources sufficiently in a radio communication system where non-orthogonal multiplexing is employed. Also, with the radio communication method according to the present embodiment, the radio base station BS reports information corresponding to the power ratio set (common report information), and information related to downlink signal transmission power, which is specific to each user terminal UE (dedicated report information), to each user terminal UE, so that each user terminal UE can cancel downlink signals for other terminals and receive the downlink signal for the subject terminal adequately.

(Example Structure of Radio Communication System)

Figure 4:
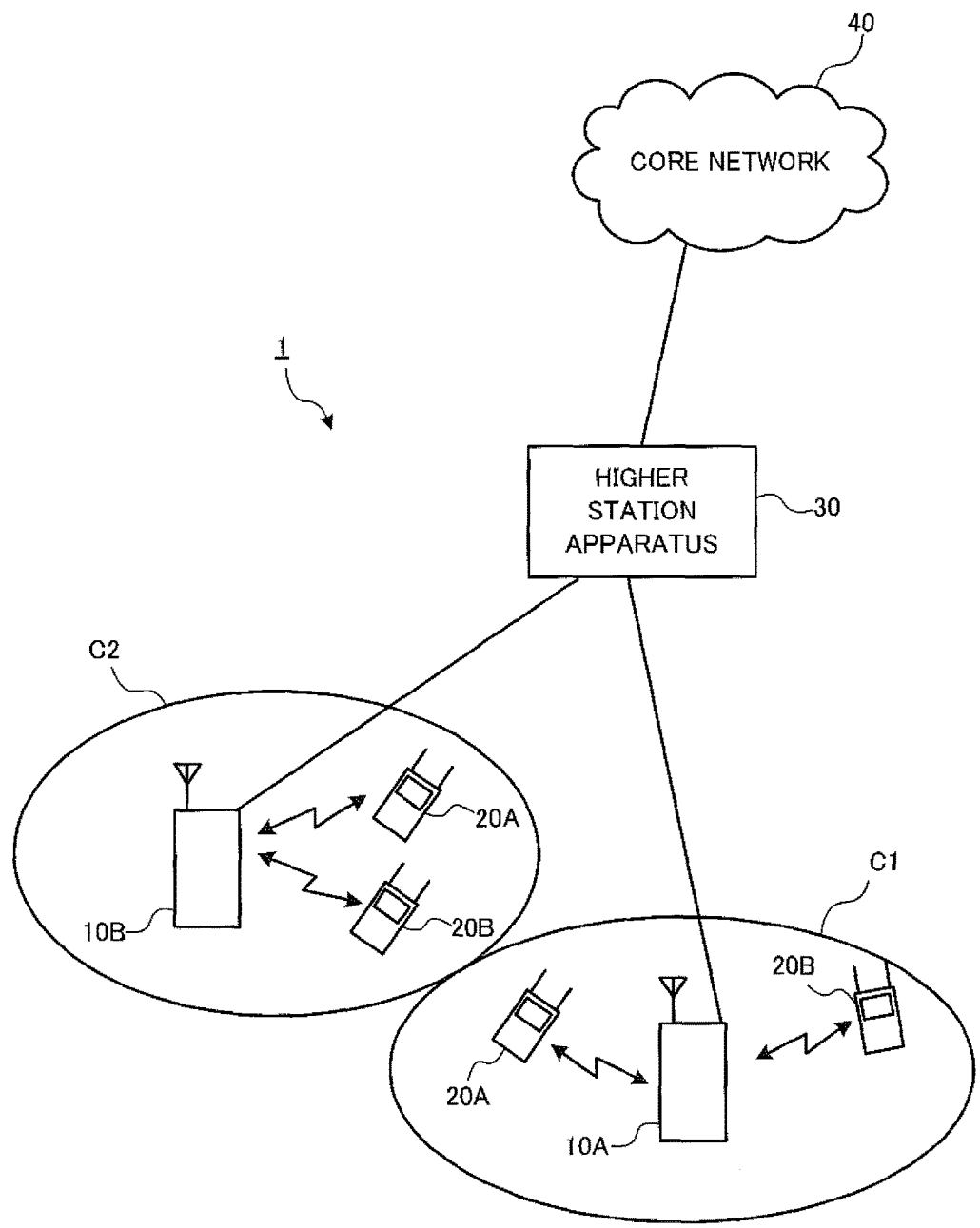
FIG. 4 is a schematic diagram to illustrate an example structure of a radio communication system.

Now, the radio communication system according to the present embodiment will be described below in detail. FIG. 4 is a schematic diagram to illustrate an example structure of a radio communication system according to the present embodiment. Note that the radio communication system illustrated in FIG. 4 is a system to accommodate, for example, an LTE system or an LTE-A (LTE-Advanced) system. This radio communication system may be referred to as "IMT-advanced," or may be referred to as "4G."

As illustrated in FIG. 4, a radio communication system 1 includes radio base stations 10 (10A and 10B), and a plurality of user terminals 20 (20A and 20B) that communicate with these radio base stations 10. The radio base stations 10 are connected with a higher station apparatus 30, and this higher station apparatus 30 is connected with a core network 40. The user terminals 20 can communicate with the radio base stations 10 in cells C1 and C2. In this radio communication system 1, the user terminals 20 may be mobile terminals or may be fixed terminals. Note that the higher station apparatus 30 may be, for example, an access gateway apparatus, a radio network controller (RNC), a mobility management entity (MME) and so on, but is by no means limited to these.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing the system band into bands formed with one or continuous resource blocks, per terminal, and allowing a plurality of terminals to use mutually different bands. Note that, if necessary, NOMA is applied to the downlink in this radio communication system 1.

Here, communication channels that are used in the radio communication system 1 illustrated in FIG. 4 will be described. Downlink communication channels include a PDSCH (Physical Downlink Shared CHannel), which is used by each user terminal 20 on a shared basis, and downlink L1/L2 control channels (a PDCCH, a PCFICH, a PHICH and an enhanced PDCCH). User data and higher control information are transmitted by the PDSCH. Scheduling information for the PDSCH and the PUSCH and so on are transmitted by the PDCCH (Physical Downlink Control CHannel). The number of OFDM symbols to use for the PDCCH is transmitted by the PCFICH (Physical Control Format Indicator CHannel). HARQ ACKs and NACKs for the PUSCH are transmitted by the PHICH (Physical Hybrid-ARQ Indicator CHannel).

Uplink communication channels include the PUSCH (Physical Uplink Shared CHannel), which is used by each user terminal 20 on a shared basis as an uplink data channel, and a PUCCH (Physical Uplink Control CHannel), which is an uplink control channel. User data and higher control information are transmitted by this PUSCH. Also, by means of the PUCCH, downlink channel quality information (CQI: Channel Quality Indicator), ACKs/NACKs and so on are transmitted.

Figure 5:
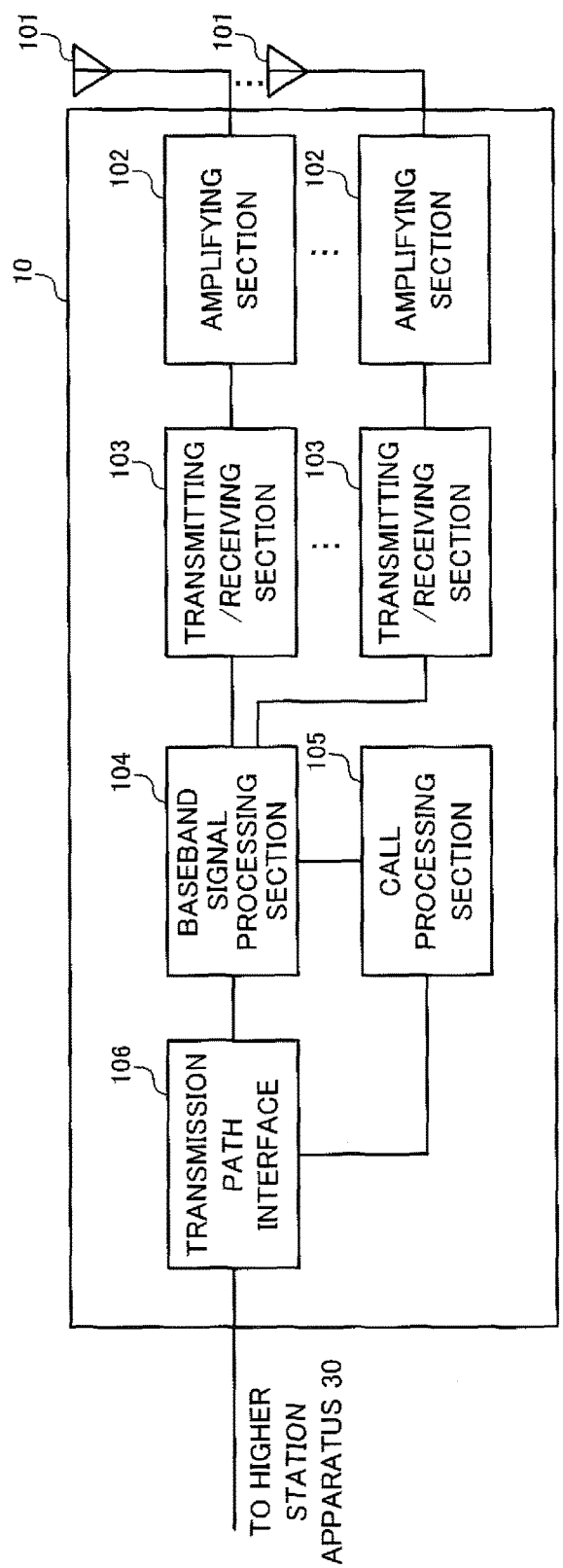
FIG. 5 is a block diagram to illustrate an example structure of a radio base station.

FIG. 5 is a block diagram to illustrate an example structure of a radio base station according to the present embodiment. A radio base station 10 has a plurality of transmitting/receiving antennas 101 for beamforming, amplifying sections 102, transmitting/receiving sections 103, a baseband signal processing section 104, a call processing section 105 and a transmission path interface 106.

User data to be transmitted from the radio base station 10 to a user terminal 20 on the downlink is input from the higher station apparatus 30, into the baseband signal processing section 104, via the transmission path interface 106.

In the baseband signal processing section 104, the user data that is input is subjected to a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process, and then transferred to each transmitting/receiving section 103. Furthermore, downlink control information is subjected to transmission processes such as channel coding and an IFFT process, and transferred to each transmitting/receiving section 103.

Also, the baseband signal processing section 104 reports control information for communication in the serving cell to the user terminals 20 through a broadcast channel. The information for communication in the serving cell includes, for example, the uplink or downlink system bandwidth.

Each transmitting/receiving section 103 converts the baseband signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, data to be transmitted from the user terminal 20 to the radio base station 10 on the uplink is received in each transmitting/receiving antenna 101 and input in the amplifying sections 102. Radio frequency signals that are input from each transmitting/receiving antenna 101 are amplified in the amplifying sections 102 and sent to each transmitting/receiving section 103. The amplified radio frequency signals are converted into baseband signals in each transmitting/receiving section 103, and input in the baseband signal processing section 104.

In the baseband signal processing section 104, the user data included in the baseband signals that are input is subjected to an inverse fast Fourier transform (IFFT) process, an inverse discrete Fourier transform (IDFT) process, error correction decoding, a MAC retransmission control receiving process, and RLC layer and PDCP layer receiving processes, and transferred to the higher station apparatus 30 via the transmission path interface 106. The call processing section 105 performs call processing such as setting up and releasing communication channels, manages the state of the radio base station 10 and manages the radio resources.

Figure 6:
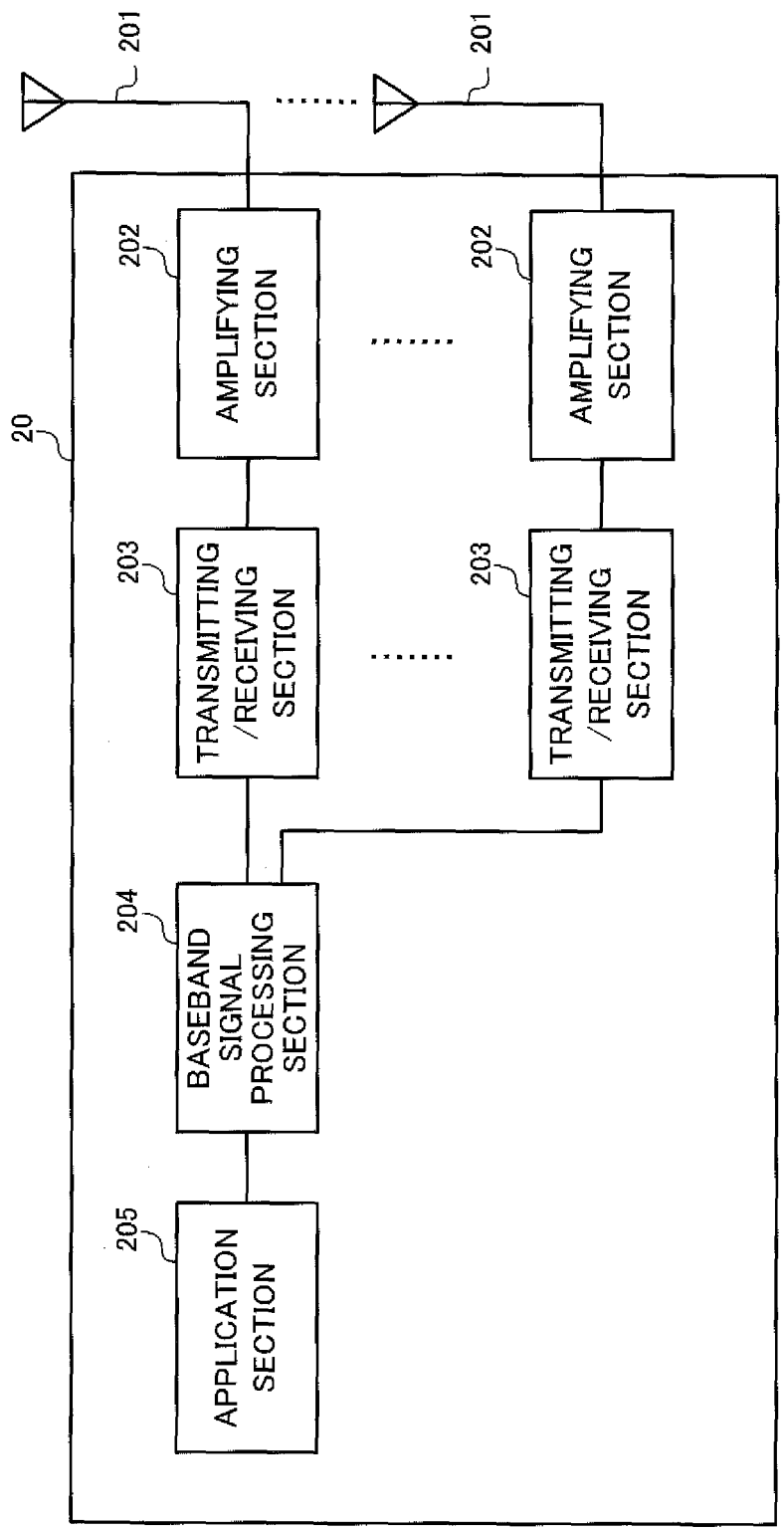
FIG. 6 is a block diagram to illustrate an example structure of a user terminal.

FIG. 6 is a block diagram to illustrate an example structure of a user terminal according to the present embodiment.

A user terminal 20 has a plurality of transmitting/receiving antennas 201, amplifying sections 202, transmitting/receiving section 203, a baseband signal processing section 204 and an application section 205.

Downlink data is received in a plurality of transmitting/receiving antennas 201 and input in the amplifying sections 202. The radio frequency signals input from each transmitting/receiving antenna 201 are amplified in the amplifying sections 202 and sent to each transmitting/receiving section 203. The amplified radio frequency signals are converted into baseband signals in each transmitting/receiving section 203, and input in the baseband signal processing section 204. In the baseband signal processing section 204, the baseband signals that are input are subjected to an FFT process, error correction decoding, a retransmission control receiving process and so on. The user data that is included in the downlink data is transferred to the application section 205. The application section 205 performs processes related to higher layers above the physical layer and the MAC layer. Also, the broadcast information that is included in the downlink data is also transferred to the application section 205.

Meanwhile, uplink user data is input from the application section 205 to the baseband signal processing section 204. In the baseband signal processing section 204, the user data that is input is subjected to a retransmission control (H-ARQ (Hybrid ARQ)) transmission process, channel coding, precoding, a discrete Fourier transform (DFT) process, an IFFT process and so on, and then transferred to each transmitting/receiving section 203. The baseband signals that are output from the baseband signal processing section 204 are converted into a radio frequency band in the transmitting/receiving sections 203. After that, the radio frequency signals having been subjected to frequency conversion are amplified in the amplifying sections 202 and transmitted from the transmitting/receiving antennas 201.

Figure 7:
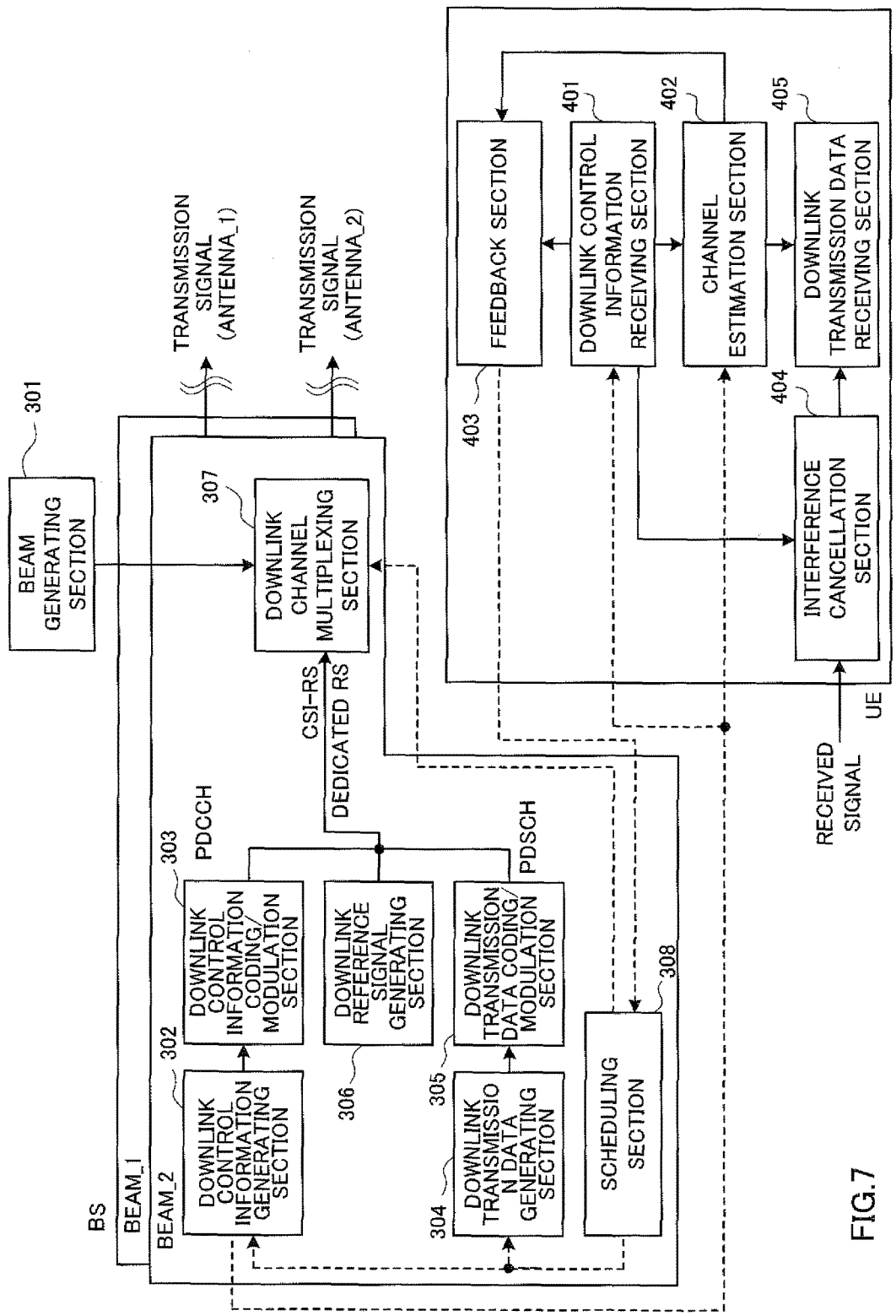
FIG. 7 is a block diagram to illustrate example structures of baseband signal processing sections provided in a radio base station and a user terminal.

FIG. 7 is a block diagram to illustrate example structures of the baseband signal processing sections provided in the radio base station and the user terminal according to the present embodiment. Note that, although FIG. 7 illustrates only part of the structures, the radio base station 10 and the user terminal 20 have components that are required, without shortage.

As illustrated in FIG. 7, the radio base station 10 has a beam generating section 301, a downlink control information generating section 302, a downlink control information coding/modulation section 303, a downlink transmission data generating section 304, a downlink transmission data coding/modulation section 305, a downlink reference signal generating section 306, a downlink channel multiplexing section 307 and a scheduling section 308.

The beam generating section 301 generates a plurality of transmission beams using arbitrary radio resources (frequency band, time slots, etc.). In each transmission beam that is generated in the beam generating section 301, downlink signals for user terminals 20 that are selected in the scheduling section 308, which will be described later, are non-orthogonal-multiplexed.

The downlink control information generating section 302 generates user terminal-specific (UE-specific) downlink control information (DCI) to be transmitted by the PDCCH. The user terminal-specific downlink control information includes DL assignments, which are PDSCH allocation information, UL grants, which are PUSCH allocation information, and so on. Also, this downlink control information includes control information for requesting a feedback of CSI to each user terminal 20, information that is required in the receiving process of non-orthogonal-multiplexed signals, and so on. That is, the radio base station 10 reports information corresponding to the power ratio set that is selected for non-orthogonal-multiplexing (common report information), information about downlink signal transmission power that is user terminal 20-specific (dedicated report information), and so on, to each user terminal 20, by means of the PDCCH. However, these pieces of information may be included in higher control information that is reported through higher layer signaling (such as RAC signaling).

The downlink control information that is generated in the downlink control information generating section 302 is input in the downlink control information coding/modulation section 303, with shared control information that is common between the user terminals 20, as downlink control information to be transmitted by the PDCCH. The downlink control information coding/modulation section 303 performs channel coding and modulation of the downlink control information that is input. The modulated downlink control information is output to the downlink channel multiplexing section 307.

The downlink transmission data generating section 304 generates downlink user data on a per user terminal 20 basis. The downlink user data that is generated in the downlink transmission data generating section 304 is input in the downlink transmission data coding/modulation section 305, with higher control information, as downlink transmission data to be transmitted in the PDSCH. The downlink transmission data coding/modulation section 305 performs channel coding and modulation of the downlink transmission data for each user terminal 20. The modulated downlink transmission data is output to the downlink channel multiplexing section 307.

The downlink reference signal generating section 306 generates downlink reference signals (the CRS (Cell-specific Reference Signal), the CSI-RS, the DM-RS and so on). The generated downlink reference signals are output to the downlink channel multiplexing section 307.

The downlink channel multiplexing section 307 combines the downlink control information, the downlink reference signals and the downlink transmission data (including higher control information), and generates downlink signals. To be more specific, following scheduling information that is reported from the scheduling section 308, the downlink channel multiplexing section 307 non-orthogonal-multiplexes downlink signals for a plurality of user terminals 20 selected in the scheduling section 308, in each transmission beam, so that these downlink signals are transmitted with selected transmission power. The downlink signals generated in the downlink channel multiplexing section 307 undergo an inverse fast Fourier transform process, a precoding process and so on, and transferred to the transmitting/receiving sections 103.

The scheduling section 308 generates scheduling information for commanding allocation of radio resources, based on command information from the higher station apparatus 30 and CSI (CQIs (Channel Quality Indicators), RIs (Rank Indicators) and so on) from each user terminal 20. To be more specific, the scheduling section 308 selects the candidate user set and the power ratio set to use in non-orthogonal-multiplexing, based on the CSI fed back from the user terminal 20, from among a plurality of candidate user sets that each indicate candidates of user terminals 20 to be subject to the non-orthogonal-multiplexing in a given frequency band, and a plurality of power ratio sets that each indicate a transmission power ratio of downlink signals for the user terminals 20 indicated in each candidate user set (step ST22 to ST26 of FIG. 3).

As illustrated in FIG. 7, a user terminal 20 has a downlink control information receiving section 401, a channel estimation section 402, a feedback section 403, an interference cancelation section 404 and a downlink transmission data receiving section 405.

A downlink signal that is sent out from the radio base station 10 is received in the transmitting/receiving antennas 201, undergoes removal of the cyclic prefixes, a fast Fourier transform process and so on, and then transferred to the baseband signal processing section 204. In the baseband signal processing section 204, the downlink signal is separated into the downlink control information, the downlink transmission data (including higher control information), and the downlink reference signals. The downlink control information is input in the downlink control information receiving section 401, the downlink transmission data is input in the downlink transmission data receiving section 405 and the downlink reference signals are input in the channel estimation section 402.

The downlink control information receiving section 401 demodulates the downlink control information and outputs the result to the channel estimation section 402, the feedback section 403, the interference cancelation section 404 and so on. When a CSI feedback request is received via the downlink control information, the channel estimation section 402 performs channel estimation based on the downlink reference signals received, and calculates the channel gain. CSI that includes the channel gain acquired by the channel estimation and so on is fed back to the radio base station 10 through the feedback section 403.

The interference cancelation section 404 cancels the interference between the transmission beams by using, for example, a linear filter. Also, the interference cancelation section 404 cancels the interference by the signals for other user terminals 20, based on information that corresponds to the power ratio set selected for non-orthogonal-multiplexing (common report information), information that relates to downlink signal transmission power, which is user terminal 20-specific (dedicated report information), and so on. To be more specific, the interference cancelation section 404, for example, cancels signals for user terminals 20 that are allocated greater transmission power than the subject terminal, in descending order of transmission power, by means of SIC. On the other hand, the interference cancelation section 404 sees signals for user terminal 20 that are allocated lower transmission power than the subject terminal as noise, and disregards them without cancelation.

As described above, with the radio communication system 1 according to the present embodiment, the radio base station 10 selects appropriate power ratio sets, depending on the communication environment each user terminal 20 is in, from a plurality of power ratio sets that each indicate a transmission power ratio of downlink signals for each user terminal 20, so that it is possible to improve the efficiency of the use of radio resources sufficiently. Also, with the radio communication system 1 according to the present embodiment, the radio base station 10 reports information that corresponds to the power ratio set (common report information) and information that relates to downlink signal transmission power, which is specific to each user terminal 20 (dedicated report information), to each user terminal 20, so that each user terminal 20 can cancel downlink signals for other terminals and adequately receive the downlink signal for the subject terminal.

The present invention can be implemented with various corrections and in various modifications, without departing from the spirit and scope of the present invention. That is to say, the descriptions herein are provided only for the purpose of illustrating examples, and should by no means be construed to limit the present invention in any way.

The disclosure of Japanese Patent Application No. 2013-024335, filed on Feb. 12, 2013, including the specification, drawings and abstract, is incorporated herein by reference in its entirety.

The invention claimed is:

1. A user terminal comprising:
    a receiver that receives downlink signals that are multiplexed and transmitted for a plurality of user terminals and receives information about presence or absence of interference of the downlink signals on a Physical Downlink Control Channel (PDCCH), the information including a bit sequence and indicating a plurality of transmission power ratios; and
    a processor that demodulates a signal for the user terminal from the downlink signals based on the information about presence or absence of the interference.

2. The user terminal according to claim 1, wherein a base station selects a transmission power ratio set for the user terminal from predetermined different transmission power ratios based upon channel state information feedback from the user terminal, and a processor of the user terminal demodulates the signal based on the information about presence or absence of the interference.

3. The user terminal according to claim 1, wherein the processor obtains information that indicates presence or absence of the interference and information that indicates the transmission power ratio based on the information about presence or absence of the interference.

4. The user terminal according to claim 1, wherein
    the information about presence or absence of the interference indicates transmission power allocated for the user terminal,
    the processor uses the information about presence or absence of the interference as a basis to subtract the transmission power allocated for the user terminal from total transmission power and to calculate transmission power allocated an interfering user terminal.

5. The user terminal according to claim 1, wherein the receiver receives the information about presence or absence of the interference by a downlink control signal transmitted on PDCCH (Physical Downlink Control Channel).

6. A radio base station comprising:
    a processor that multiplexes downlink signals for a plurality of user terminals;
    the processor generates information about presence or absence of the interference of the downlink signals on a Physical Downlink Control Channel (PDCCH), the information including a bit sequence and indicating a plurality of transmission power ratios; and
    transmitter that transmits multiplexed downlink signals and the information about presence or absence of the interference of the downlink signals.

7. The radio base station according to claim 6, wherein the transmitter transmits the multiplexed downlink signals based on a given transmission power ratio.

8. A radio communication method for a user terminal, comprising:
    receiving downlink signals that are multiplexed and transmitted for a plurality of user terminals;
    receiving information about presence or absence of interference of the downlink signals on a Physical Downlink Control Channel (PDCCH), the information including a bit sequence and indicating a plurality of transmission power ratios; and demodulating a signal for the user terminal from the downlink signals based on the information about presence or absence of the interference.

\* \* \* \* \*